(12) United States Patent
Hugot

(10) Patent No.: US 10,841,276 B2
(45) Date of Patent: Nov. 17, 2020

(54) METHOD AND SYSTEM FOR CARRYING OUT A SENSITIVE OPERATION IN THE COURSE OF A COMMUNICATION SESSION

(71) Applicant: GEMALTO SA, Meudon (FR)

(72) Inventor: Didier Hugot, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 16/465,781

(22) PCT Filed: Dec. 1, 2017

(86) PCT No.: PCT/EP2017/081168
§ 371 (c)(1),
(2) Date: May 31, 2019

(87) PCT Pub. No.: WO2018/100145
PCT Pub. Date: Jun. 7, 2018

(65) Prior Publication Data
US 2020/0028819 A1    Jan. 23, 2020

(30) Foreign Application Priority Data

Dec. 1, 2016 (EP) .................................... 16306598

(51) Int. Cl.
*H04L 29/12* (2006.01)
*H04L 29/06* (2006.01)
*H04L 29/08* (2006.01)

(52) U.S. Cl.
CPC ...... *H04L 61/3025* (2013.01); *H04L 61/1511* (2013.01); *H04L 61/1552* (2013.01); *H04L 63/1466* (2013.01); *H04L 67/02* (2013.01)

(58) Field of Classification Search
CPC ............. H04L 61/3025; H04L 61/1511; H04L 61/1552; H04L 61/1446; H04L 67/02; G06F 16/9566; G06F 21/55
See application file for complete search history.

(56) References Cited

U.S. PATENT DOCUMENTS 8,856,869 B1 *  10/2014  Brinskelle ............... G06F 21/31
                                              726/2
9,241,004 B1 *   1/2016  April ........................ G06F 21/60
(Continued)

OTHER PUBLICATIONS

International Search Report (PCT/ISA/210) with translation and Written Opinion (PCT/ISA/237) dated Mar. 23, 2018, by the European Patent Office as the International Searching Authority for International Application No. PCT/EP2017/081168.

*Primary Examiner* — Michael A Keller
*Assistant Examiner* — Jsing Forng Lin
(74) *Attorney, Agent, or Firm* — Buchanan Ingersoll & Rooney PC

(57) ABSTRACT

The invention relates to a method for carrying out a sensitive operation in the course of a communication between a processing unit and a first service server, said first server being accessible via a first domain name and/or first electronic address. The method comprises the step of using at least one second domain name different from the first and/or a second electronic address different from the first to carry out all or part of the sensitive operation. The invention also relates to a system corresponding to the method and comprising the server and/or the processing unit.

10 Claims, 2 Drawing Sheets

(56) References Cited

U.S. PATENT DOCUMENTS

| | | | |
|---|---|---|---|
| 2011/0289138 A1* | 11/2011 | Turakhia | G06F 21/41 |
| | | | 709/203 |
| 2012/0124372 A1* | 5/2012 | Dilley | H04L 67/2819 |
| | | | 713/162 |
| 2016/0057165 A1 | 2/2016 | Thakar et al. | |
| 2016/0253718 A1 | 9/2016 | Carasso | |
| 2017/0032147 A1* | 2/2017 | Denner | G06F 21/6263 |
| 2017/0169100 A1* | 6/2017 | Reshadi | G06F 21/64 |
| 2017/0187536 A1* | 6/2017 | Meriac | G06F 16/9566 |
| 2018/0191754 A1* | 7/2018 | Higbee | H04L 63/20 |

* cited by examiner

METHOD AND SYSTEM FOR CARRYING OUT A SENSITIVE OPERATION IN THE COURSE OF A COMMUNICATION SESSION

FIELD OF THE INVENTION

The invention relates to a method and a system for carrying out a sensitive operation in the course of a communication session.

More specifically, the communication session takes place between a computer processing unit and a first service server, the latter being accessible via a first computer domain name.

The invention more particularly relates to the security of communication hardware and software environments, particularly on the Internet, using communication browsers; it aims in particular to thwart attacks of the HDM (Man in the Middle) or HDN (Man in the browser) type.

It may relate to other types of communication or communication network, in particular local intranet, telephone, radio frequency, Bluetooth™, Wi-Fi™ or another wired or wireless communication network.

A communication browser, such as a web browser, is a software program that enables a computer to consult and/or exchange information available on another computer, in particular via the Internet (WEB: World Wide Web) or another communication network. There are different web browsers, depending on different operating systems (GNU/Linux™, Windows™, iOS™, Android™ . . . ) and/or the type of computer (PC, touch pad, mobile phones, PDA, etc.). The most commonly used at the moment are Mozilla Firefox™, Google Chrome™, Internet Explorer™; Edge™, Safari™

PRIOR ART

Transaction security solutions are available, which use a secure (or trusted) browser but which cannot be easily implemented in practice because they require the installation of a specific secure browser (or specific software application).

However, users are too familiar with their own currently marketed browser such as "Google Chrome™, Edge™, Firefox™" and are not willing to install and/or use another specific browser instead.

Extensions to the current browser are also available but these also require the user's intervention.

Out-of-band communication (via a network different from the one used for the operation and on a different peripheral device) can also be used to confirm a sensitive operation. The user may thus notice a possible discrepancy between the information entered in the browser and the one received on his/her different device.

Such a solution has the disadvantage of being less practical because it requires several devices to carry out the sensitive operation.

TECHNICAL PROBLEM

More and more secure services are available on-line (on-line banking or e-commerce, government services, etc.), for reasons that are very convenient for users but that expose same to numerous malicious computer attacks.

Possible attacks exploit different types of vulnerabilities at the:
Servers hosting the Internet (web) service application;
Indeed, there may be an insufficient filtering of the data provided by users in HTML forms or in URL address settings or lack of protection against denial of service attacks (DDoS: Distributed Denial of Service;
The network that allows attacks of the (HDM) type;
From the IT client: (web browser, computer . . . ) There may be malicious software (Malware) in the web browser (Man-in-the-browser) installed by hackers to execute computer attacks including diversion, web page modification.

Although vulnerabilities can be more or less easily mitigated on the other hand, attacks on the "client" side (but also on the network attack side) are much more complex to solve (keystroke logger, HDM, Man-in-the-browser . . . ).

In the event that the web browser is compromised by malware, the elements of the transaction (e.g. the name of the beneficiary, the amount transferred) can be modified in the browser in a way that is transparent to the user.

As a result, the user may give his/her consent to a specific transfer but in fact the actual transfer is made with a different amount and a different beneficiary.

The invention aims to solve the disadvantages of the prior art; it aims in particular to solve "man in browser" attacks (a malicious code in the program or "client" computer).

It aims preferably at a solution which in easily implemented and/or as transparent as possible for a user.

SUMMARY OF THE INVENTION

In order to solve the above problems, in a way that is convenient for the user, the invention uses, in a preferred (non-exclusive) way, a concept of cross-domain (or cross-IP address) browsing session. This means that the user preferably always browses the same website, but the domain name and/or the IP address used for the browsing session may be variable (or changing) in the course of a session or simply different, for the communication session, from the one expected by a hacker or malware; if necessary, preferably, the session may use anonymous domain names.

For this purpose, the object of the invention is a method for carrying out a sensitive operation in the course of a communication between a processing unit and a first service server, said first server being accessible via a first domain name ND1 and/or a first electronic address IP1;

The method is characterized in that it comprises the step of using at least one second domain name ND2 different from ND1 and/or a second electronic address IP2 different from IP1 to carry out all or part of said sensitive operation.

Thus, the detection of a sensitive operation by malware in a user's browser or processing unit is made more difficult.

Malware expects a communication on a certain domain name and/or IP address of a known type when it occurs otherwise.

Dynamic web domain names clearly identify the same service provider. They provide a first level of security by distributing the same user session over several web domain names.

According to other characteristics of the method:
All or part of the sensitive operation can be carried out as from the beginning of the session on a domain name and/or an IP address different from the ones expected (without having to change a domain name and/or an IP address)
It can implement a cross-domain ND1, ND2 session sharing mechanism to allow the server and/or service application to share the same user session on at least two domain names ND1, ND2 or at least two electronic addresses IP1, IP2;

The server and/or the unit can implement instructions from a program or steps) configured to trigger at the appropriate time a cross-domain ND1, ND2 and/or cross-address IP1, IP2 browsing and carry out all or part of said sensitive operation outside the first domain name ND1 and/or the first address IP1;

The method can implement cross-domain session cookies;

The second domain name can be anonymous;

The addresses IP1 and IP2 can be different or identical, the domain names ND1 and ND2 being different from each other;

The domain names ND1, ND2 are part of a set E of domain names pointing to the same site or web page on the server 3 and the number of which is greater than or equal to two; The domain names may be renewed periodically or not (every week, month or year or randomly). The domain names may or may not be associated with a security certificate (in particular TLS) for their use (or their communication, in particular when they are registered (registration in a DNS server) in order to prevent an attacker from picking up the domain name pool when requesting registration in the DNS server);

The domain names ND1, ND2 and/or the electronic addresses IP1, IP2 are part of a set E of domain names and/or electronic addresses IP1, IP2 pointing to the same site or web page on the server 3 and the number of which is greater than two, the domain names and/or the electronic addresses IP1, IP2 being renewed regularly.

The domain names and/or the electronic addresses IP1, IP2 may or may not preferably be associated with security certificates (in particular TLS) for their use (or to secure their communication, in particular to the DNS server for registration);

The set E of domain names includes a number of domain names or electronic addresses greater than 10 or 20 or 50, all pointing to the same website or web page (Internet).

A first service server can be associated with a second service server, the first and second servers having separate addresses (or domain names) to provide the same service or sensitive operation.

The browser is an internet or intranet browser and communication is carried out on the internet or intranet network;

The invention also relates to a system (corresponding to the method) and including the server and/or the processing unit. The system is characterized in that it includes a program comprising instructions configured to use at least a second domain name ND2 different from the first domain name ND1 and/or a second electronic address IP2 different from the first address IP1, to carry out all or part of said sensitive operation.

Thus, the invention makes it possible to thwart the above-mentioned pirate attacks. The invention may be practical to use because it may be transparent to the user; it may avoid a specific software installation by the user on his/her processing unit or the use of an additional device for an out-of-band confirmation of a sensitive operation.

In addition, this figure includes steps corresponding to those used for an example of a hacked bank transfer and described below.

DESCRIPTION

In the different figures, the same references refer to identical or similar elements.

Similarly, in the description and drawings, each step of the method can correspond to a step (or an instruction) of a computer program (and vice versa). The same effect as that resulting from a step implementation occurs when instructions of a program corresponding to steps are executed by a computer server or any computer processing unit such as a computer, a microprocessor, or a micro-controller.

As a reminder, a client-server environment, (such as the one that the invention can use), can implement certain modes of communication between several programs or software and/or computers and through a communication network.

A client can designate a program or computer that can make requests while at least another program (a server computer) receives, processes requests and responds thereto, as the case may be.

In general, a server consists of a computer, a specific server program used to operate the server according to a specific function, I/O and communication network connections.

A computer "client" (a program and/or a computer) may include a program such as a computer browser, a personal computer or another portable intelligent device such as (a mobile phone, a PDA, a tablet . . . ).

For example, a data server is used to communicate data stored in a database, a web server is used to send web pages at the request of a user's computer web browsers; an electronic server is used to send electronic mails requested by electronic software (such as Outlook™) on a user's computer. A bank server gives access to a user account or a web page relating to various banking services (consultations, transfers, loan simulations, insurance, etc.)

In principle, a server can work as follows. It waits for an incoming connection on a network port, opens a communication interface, and then the server program communicates with the client using a planned communication protocol.

In principle, a client can operate as follows. It establishes the connection with the server to one or more network ports; when the connection is accepted by the server, it communicates according to the same communication protocol as the one accepted by the server.

Figure 1:
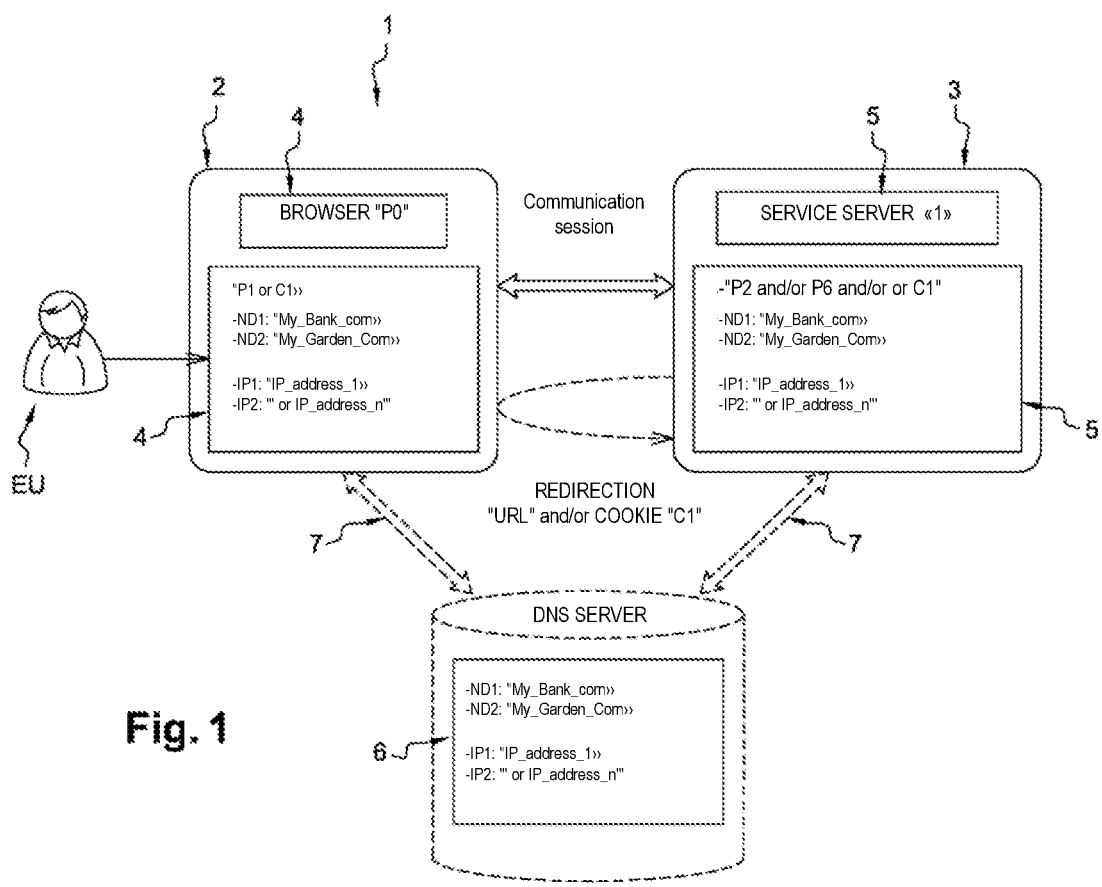
FIG. 1 illustrates a system comprising a computer browser of a processing unit (a computer) and a server of a service provider 3 (a website) according to a mode of implementation and/or one embodiment of the invention.

FIG. 1 shows, according to a first preferred embodiment of the invention, a system 1 (2 and/or 3) for carrying out a sensitive operation in the course of a communication between a processing unit 2 and a first service server 3; the first server 3 is configured to be normally accessible via a first domain name ND1 and/or first electronic address IP1 assigned thereto.

An address IP1 and/or a domain name ND1 has been assigned to the server. This address IP2 and/or domain name ND1 can be stored in a DNS server and/or in the configuration settings of a network card of the processing unit and/or the server.

The processing unit can store the domain name ND1 and/or the address IP1 in memory, in particular by initializing, configuring the communication network card parameters (the modem, the interface, etc.), or include a URL link, a preceding session cookie in a temporary file or other redirection or computer addressing mechanism.

Cookies generally include computer files stored by the web browser on a hard disk of a processing unit (or a user terminal) accessing a website; their function is specifically to store information about a user or his or her Internet browsing. A website can thus identify a visitor, his or her interests and adapt the pages to the user. Cookies can include strings of characters in which a program code could be found as well as sensitive data such as keys, certificates . . . . If a cookie is not large enough for a program, several cookies can be associated to restore a program.

In the example, the processing unit 2 is a personal computer; however, it can be a tablet, a PDA, a mobile phone or another device. The unit includes hardware (network card . . . ) and software of a known type of communication on the Internet, (communication interface, web browser, memories 4 . . . ). Communication can be established with servers such as e-commerce or bank sites, any service(s) (a web application) including retail, health, government, fiscal, tax, or storage sites . . . .

The system is configured to open a communication session via any communication network with the outside world (including the Internet: web) and to send transaction requests RT (or operation) to a service server 3, via a web browser; this browsing is illustrated here by software P0 and/or P1 of said unit 2 stored in (non-volatile) memories 4. The browser's main function is to search and/or display and/or dialogue and/or interact and/or exchange information, including web pages from a website or a service provider server.

The processing unit implicitly includes a man/machine interface; The interface can include a keyboard, a screen, a computer mouse; It can also include a microphone, a fingerprint sensor, possibly an authentication object such as a flash drive (connected to the computer); It can include a computer mouse. The interface makes it possible to select, fill in fields displayed on an HTML page, validate by clicking on fields, click on URL links contained in a displayed page. The unit can include any other application software, including browser extensions.

According to one characteristic of the first embodiment, the system 1 (2 and/or 3) may include a program P1 and/or P2 including instructions configured to use at least one second domain name ND2 different from the first domain name ND1 and/or a second electronic address IP2 different from the first address IP1, to carry out all or part of said sensitive operation.

The invention may implicitly provide for the above step that at least a second electronic domain name ND2 will be assigned to the service server 3 (as for DN1). It can also or alternatively provide that at least a second electronic address IP2 will be assigned to the service server 3 (as for IP1).

IP2 and/or ND2 can be found stored in the unit 2 and/or the server 3 in the same way as for IP1 and/or ND2 described above.

In the example, the second domain name (like the first one) is registered or declared in a domain name DNS server.

Alternatively, the invention may preferably provide for a set E of domain names (including ND1, ND2, NDn) registered in the DNS server and pointing to the same website of the server 3 (or a web page of the server 3); (Idem to have a large set of IP1, IP2, IPn addresses . . . ). If necessary, these names may be renewed regularly. The domain names can be associated with the same or different IP addresses.

In fact, the method may include a step of generating a set of domain names greater than two (or greater than 5 or 10 or 30 or even 50 to significantly improve security, since the higher the number, the more security there is).

The generation of the set E of domain names and the registration thereof on the DNS server can be automatically done by a program P6 (below) hosted on the server 3 or elsewhere.

The domain names can preferably be anonymous or not, or have no literal or symbolic meaning (or meaning of the dictionary).

They may or may not be renewed regularly (for example, weekly, monthly or annually);

Domain name communication between the server 3 and the DNS server (as well as the subsequent use of the created domain names) is preferably secure and/or associated with a TLS (Transport Layer Security) certificate from a certification authority CA. The TLS certificate enables a secure communication of the HTTPS type on the Internet network. The TLS protocol enables the authentication of the communicating parties, including the DNS server and the server 3 (or the unit 2 and the server 3) as well as data confidentiality on the Internet; it can detect corrupted data; the data can also be compressed.

These domain names all point to or correspond to the same website (or web application) with the same IP address (or not) associated. These names can be created manually or automatically by a software application P6 hosted in particular in the service server 3. A submission to the DNS server for creation (or registration or subscription) can also be automatic.

The Domain Name System (DNS) is a service that matches a domain name to an IP address. When a website domain name is entered by a US user into the address bar of a web browser of a processing unit (a computer), a DNS server identifies the IP address corresponding to that website. The processing unit then uses this IP address to locate and connect to the site.

Access to a DNS server can be managed by a user's Internet service provider; in addition, the DNS server can be stored in the network configuration of the processing unit. There is a network of DNS servers with a cache system, each DNS entry being accompanied by a lifetime allowing the information to be hidden without having to systematically query the DNS server.

If necessary, in an alternative (later developed) embodiment, at least one second domain can correspond to a second server that is distinct from or identical to the first server with a different or identical IP address.

For a characteristic of the first embodiment, in the example, the instructions of a program P1 and/or P2 (corresponding to the process steps of the invention) are configured to use at least one domain name different from the first one in the course of a communication (or web browsing) session.

The domain name expected or known to the hacker (e.g. My Bank) is preferably no longer used (or as little as possible) in the browser address bar because it is substituted by a different, harmless domain name (e.g. My Garden) because it is substituted at a convenient time (predetermined or random or any other time) by a second web address or URL among an anonymous address or a confidential and/or regularly changed address.

Substitution can be made using the program P1 of the processing unit and/or the program P2 in the server.

The appropriate timing can be determined as illustrated later by a expert risk analysis program P6 for the operation.

Alternatively, in a preferred embodiment, the instructions in program P1 and/or P2 can be configured to distribute the user session over at least two domain names and/or two addresses IP1/IP2 as soon as the session is opened and in the course of the same session. For example, the session is initiated with one ND1 (or IP1) and terminated with the other ND2 (or IP2).

Also, in order not to raise suspicions in the fraudster's mind, the session may return with the initial domain name and be terminated at a non-critical stage, in particular for abandoning or cancelling the operation (when the user has become aware of the hacking). However, in a nominal use case, the user can return to the initial domain after carrying out the sensitive operation (not only in case of abandonment).

Optionally, at least one second domain can correspond to a second server distinct from the first server and having a "misleading" masked domain name that has nothing to do with the server service or sensitive operation (ex: My Garden/My Bank).

For example, for a transfer to an on-line banking site with the domain name "MyBank.com", the second server may be a garden centre site with the domain name "Mygarden.com" or with random domain names that may be random associations of words from a dictionary, or domain names that have no particular meaning.

The domain name "My Garden" can point to or correspond to a second one a banking website that can be directly related to the banking server "MyBank.com".

About the Software Configuration of the Processing Unit 2.

The above-mentioned program P1 (or cookie code Cl) is for example stored in a program memory 4 of the user's processing unit. The program or micro-code can be provided beforehand P1 in the course of or after the sensitive operation session but it is preferably deployed in the course of the session, in particular in the form of a cookie Cl;

The micro-code Cl can be, at least temporarily, stored, installed, downloaded, in the course of a user session, in particular by a remote server 3.

The program (or file) P1 can be stored as a micro-code or cookie Cl, for example as a temporary executable file. It can be a sub-program of the browser PO that the latter calls for execution.

The program P1 can, at the limit, be constituted at the base of the program PO of the browser but by being configured as P1 (in particular by the server) with specific parameters filled in fields of parameters of the browser such as data, information, encryption key, certificate, received notably from the service server, communication session keys, session cookies . . . , URL addresses, domain names).

The micro-code Cl (or program P1) can include an electronic address, (especially of the URL type) for forwarding to a second domain name ND2 and/or address IP2. This second domain name can point to an IP address of a service server and/or a web application.

The program P1 can be stored in the unit (preferably by the server) and in a transparent way for the user); it can optionally be stored by the user beforehand, for example, by downloading from the server when registering or first using a website.

The program P1 in the browser (or associated with it) can automatically detect in the browser address bar an entry of all or part of the domain name ND1 and/or display of an address IP1 of the sensitive operating service site, and automatically switch to the very beginning (or just before the session or sending the search to a second domain name ND2 and/or second address IP2 corresponding to the same website.

Thus, thanks to this feature above, browsing on the known (or monitored) site can be carried out from the beginning of the communication with a domain name different from the one expected by the hacker, thus thwarting any attack.

About the Software Configuration of the Server 3.

The invention may provide a program P2 for example in one of the non-volatile memories 5 of the service server or a memory linked thereto. The program P2 may include instructions that, when executed by the server, are configured to use, at any time or at a convenient time (described below in an example), the second domain name ND2 (and/or second address IP2) by said unit and carry out all or part of said sensitive operation with said second domain name (and/or address IP2).

Of course, this second domain name ND2 can point to the same website (or server 3 or application P2) with the same IP address that does not appear in principle in the browsing bar of the processing unit or that can appear in a harmless or anonymous way. This second domain name can also point to a site on another server and the IP address can be the same or preferably different.

The server 3 can be associated with another hidden (or background) server with a second IP address and another domain name. The servers can cooperate together to provide the same service. Periodic synchronizations or secure exchanges may exist between the two or more servers in order to reconstruct the user's operations.

Anonymous domain name (or IP address) refers to domain names (or IP address) whose owner cannot be publicly known.

Harmless domain names means domain names whose wording has no connection with the activity or service monitored by a hacker such as "Garden" in relation to a known bank name "Bankl".

An insignificant domain name can also cover domain names that consist of numbers and/or letters whose assembly has no known meaning such as "LLLEER@13R.COM".

This program P2 can provide for the loading, into the user's processing unit (in the course of any session), of an executable file or a micro-code possibly P1 (or a cookie Cl including a session cookie or any information, session key, parameter, URL address IP2, domain name ND2 . . . ).

Alternatively, this program P1 (or-micro code Cl) can be loaded at any time, especially before a sensitive session, for example in the course of a user initialization/registration phase on the website corresponding to the server.

The executable file, (code or cookie) can be executed by a processor or micro-controller of the processing unit or be entrusted to the web browser PO for execution at predetermined times in the course of a computer browsing.

Figure 2:
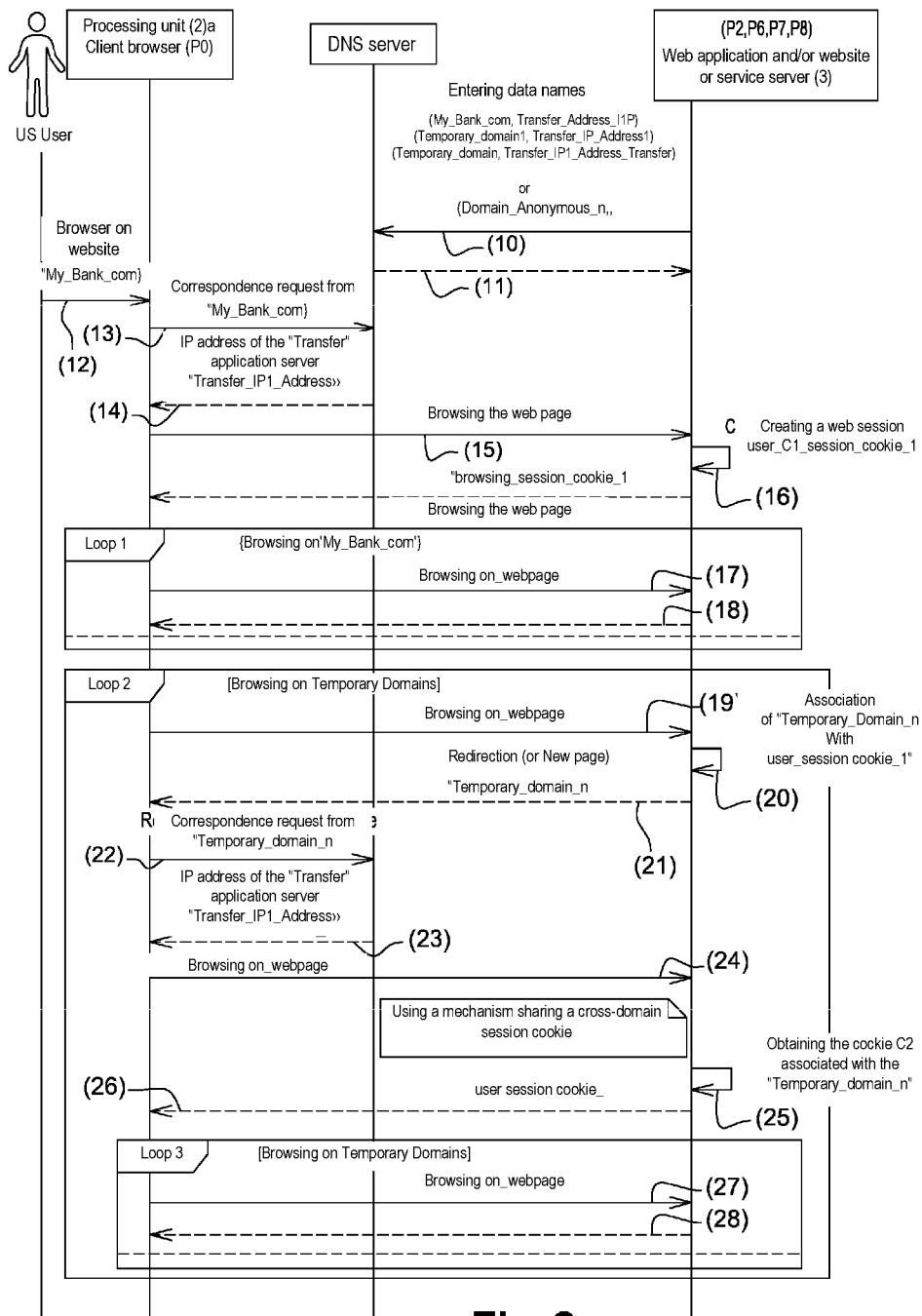
FIG. 2 illustrates a general method in accordance with a preferred embodiment of the invention including a diagram of the steps (or sequences) of a method (and/or a program) to carry out a cross-domain browsing session.

Below (FIG. 2) is Described a Preferred and General Embodiment of the Method of the Invention, Including Cross-Domain Browsing Session Sequences (or Steps).

In step 10, a web application P6 and/or P2 (or site or web server 3), creates, registers or notes at least two names here several different domain names, one of which is publicly known in a domain name DNS server.

These domain names (Temporary Domain 1; Temporary Domain n; or Anonymous Domain n) different from the known one can all be temporary and all registered in association with the same Internet IP address (Transfer IP Address 1) of a web application corresponding for example to a bank transfer application on a website, for example "My Bank.com").

These domain names can be anonymous.

An acknowledgement of receipt (step 11) can confirm the success of the return registration.

These different domain names can be stored in the memory in the service server 3 (web application P2 and/or P6); they can be accessed by a web application P2 or a client browser request P1.

In step 12, a user connects to the Internet with his/her processing unit and enters a domain name that is well known to the public ND1: "http//MyBank.com" to browse a website;

In step 13, the browser connects to a DNS server that identifies the Internet IP address corresponding to the website required by the user and returns this IP address in step 14;

In step 15, the browser connects or navigates to) to a (web page of the website 3 or the web application P2;

In step 16, the web server 3 or (application, website P2) creates (or opens) a user communication session and associates a cookie Cl (or micro-code Cl) thereto; this cookie is then stored by the server (or by the web application) in the user's processing unit 2 in step 17, notably via the browser P1;

This cookie Cl is also stored in a server memory (at least temporarily) in association with an identifier of the user's processing unit.

A first loop 1 includes steps 17, 18 illustrating several browsing exchanges made by the user on the website 3 with a known domain name ND1: "My Bank" and on the web page of the bank transfer application P2;

A second loop 2, (step 19 and following) illustrates a transition to browsing on another domain name ND2 different from the one well known as below.

In step 19, the method may include prior browsing by the user on the same well-known website of "My Bank" in which he/she has just entered details of a transfer (beneficiary, amount . . . );

In step 20, the web server 3 determines (by running a program P6 (or P8) possibly included in P2) a suitable time to trigger a preventive parry (corresponding, for example, to a critical sensitive operation to send a request to confirm a bank transfer) (step 19), associates the session cookie Cl (created beforehand) with a temporary domain name (Temporary Domain Name n) among at least one second domain name ND2 mentioned above;

The invention uses a software mechanism P7 to share sessions on several domain names "n" to switch from one domain name to another;

In step 21, the server 3 provides the processing unit with data Cl (URL and/or redirection micro-code) containing the temporary domain name "n" or an Internet page displaying one of the domain names (Temporary domain name "n");

In step 22, the browser PO or P1 of the processing unit identifies (or resolves) the new domain name ND2 (temporary domain "n") with the domain server DNS that returns (step 23), the pre-registered IP address (IP1 address Transfer) and which, according to this embodiment of the invention, is identical to that of the domain name known to the "bank transfer" application on the site "My Bank.com" (used to initiate or complete the user session having the cookie Cl);

In step 24, the browser browses again to the same website (My bank.com and the same bank transfer web page) with this temporary domain name "n" (and with the same associated IP address (IP1 address transfer);

In step 25, thanks to the above-mentioned session sharing software mechanism P7, the server obtains a cookie C2 (which may or may not contain all or part of the data contained in the cookie Cl) associated with the new temporary domain name "n" and returns (step 26) the cookie C2 to the browser P1 or the unit 2;

If necessary, this cookie C2 may be stored in the unit 2 as Cl.

In steps 27 and 28 (loop 3), the browser P1 normally browses with the temporary domain name "n";

In step 29, (not shown) the communication session is terminated at the end of the operation 28 without any hacker diverting the "transfer" web page or data of any transaction or change in data without the user's knowledge.

Alternatively, at this stage, there may be a possible browsing return to the initial domain once the sensitive operation is completed.

Using the General Mechanism of the Invention Against a Hacker Attack is Disclosed Hereunder.

In order to carry out a man-in-the-browser attack, an attacker must in principle deploy (install) a malicious software application (malware: plugin, java script) in a "client" application, usually a web browser PO on a US user's computer;

It is then necessary to spy on the browsing or different sessions in order to detect sensitive operations that can be intercepted (Malware can detect in particular that the user is browsing the X bank site and is launching a bank transfer or that he/she is on the payment page of a merchant Y).

Attacks generally target specific websites identified first by their domain names, then by specific web pages (Payment phase, delivery, entry of HTML registration form, transfer form . . . ).

The invention proposes, according to the preferred embodiment, to share a web session between several sub-sessions spread over several domains (or domain names);

These sub-sessions with multiple web domains (whether anonymous or not) can be seen as off-domain communications (distinct from the domain of the bank site X) managed for a single user session so that the malware cannot identify the sensitive operation in progress.

The invention plans to use the above-mentioned software mechanism P7 for cross-domain session sharing (which may include cookies Cl) to enable the server to share the same user session across multiple domains; without this mechanism P7, a session shared across multiple domains would be considered as a new session and the user would lose his/her initial identified session and would have to authenticate himself/herself again.

As explained in FIG. 1, thanks to this mechanism, the same web session is shared between several web domains. From the user's point of view, the mechanism is transparent, with the exception of the address in the URL bar of his/her computer, which can change several times in the course of browsing on the same website. On the contrary, this change of IP address can be perceived by the hacker as a commonplace parallel browsing by the user.

On the other hand, the different, especially temporary "n" domains, (sharing the same session) are perceived by the hacker (or malware) as other browsing sessions on different websites than those monitored by him/her and it becomes very complex for him/her to follow (or reconstitute) the same cross-domains or cross-IP addresses shared web session.

Although the allocation of domain names is practical, these sessions may be unidentifiable (or uneasily identified) in the event that the invention uses anonymous domain names. The use of anonymous domains provides more security by making it almost impossible for malware to track user sessions.

To illustrate a concrete implementation of the invention, let us suppose a sensitive bank transfer operation as mentioned above:

In step 32 (not shown but which may correspond to steps 12-16 in FIG. 1), a user accesses an on-line banking site using a well-known domain name (e.g. https://Mybank.com/);

In step 33 (not represented but which may correspond to the above-mentioned steps 17-18), the user initiates a transaction request, in this case a completed "$20 bank transfer to Mrs. X", and sends a web page to the address "https://Mybank.com/Bank Transfer";

In step 34 (not shown but which may correspond to step 19 above), a malware stored in the processing unit detects the bank transfer web page (https://Mybank.com/Bank Transfer), intercepts the transaction request and modifies the parameters thereof as follows "$200 transfer to Mr. Y.»;

In step 35 (not shown but which may correspond to step 20 above), the server 3 (or the transfer web application P2) does not know that the page has been modified; however, the application P2 (or with P7) determines that the time (or moment) is appropriate to change the domain name (and/or the IP address) among one of the following methods to trigger a cross-domain browsing.

To determine the appropriate time, the application P2 can launch or include a software routine P8 (risk analysis expert sub-program) and decide, according to the level of risk, to implement a protection mechanism (or intended to lure a pirate); The level of risk can result from an analysis of the amount involved above a predetermined threshold notably by the user's habits.

The program P8 can include an analysis of the beneficiary's name if it is new or not to the user, if the name is sounding unusual and from a high-risk country; The analysis can be based on a consultation of IP address blacklists; The analysis result can depend on a browser type/browser version . . . .

However, the application P2 randomly decides that the time is appropriate, especially at random moments or steps of the session.

However, the application P2 may decide that the time is appropriate in a predetermined manner, particularly in sensitive steps of the confirmation of an operation.

Since the appropriate time for triggering a cross-domain (and/or cross-IP addresses) browsing has occurred, the program P6 executed by the service server 3 carries out the above-mentioned step 20 (a cookie association);

Then in step 36 (not shown, which may correspond to step 21 above), the program P6 in the example makes a request to confirm the user's transfer via a new web page with an anonymous temporary domain name (https://43fjdkED3.com) different from the one (https://My Bank.com/bank transfer) from the beginning but pointing to the same website and web page;

For this purpose, the bank's website is configured to enable this security (as developed above); the new web page may contain a reference (or information) to enable the server to associate this new page with the user's initial session (in accordance with the cross-domain session cookie technology). For example, this technology may include integrating in the new web page, a hidden image of lpx that references a script in the page source attributes to establish or determine the initial session cookie in the new page); this technology is a so-called "tracking pixel" method described (https://fr.wikipedia.org/wiki/spyPixel).

Alternatively, the invention may use a transparent image measuring 1 pixel×1 pixel to enable the exchange of information enabling cross-domain browsing.

The server 3 displays in this thus created new page, the details (or settings) of the transaction, as modified by the malware and/or the hacker: "$200 bank transfer to Mr. Y."

Thanks to this permutation of domains (or domain names) in the course of the session, the new web page is unnoticed by the malware (and/or fraudster) who does not have the means to detect it and make the link with the initial bank transfer operation or session.

In fact, the hacker noticed nothing because he/she did not see the transfer confirmation page sent by the bank.

On the contrary, the invention enables the user to see the details of the transfer hacked, in particular on his/her computer screen; these details (in case of modification) are necessarily in conformity with those modified by the malware and/or the hacker (since not intercepted back from the server by the malware);

Then, in the meantime, in step 36 (not shown but which may correspond to the above-mentioned steps 22, 23), the system (including the unit 2, P1 and also here the DNS server) finds the initial IP address of the bank transfer web page (https: //My Bank.com/Bank transfer);

Finally, in step 37 (not shown but which may correspond to steps 22, 23 above), the user realizing that the details of the transaction have been compromised, may reject the bank transfer transaction.

Advantageously, in the absence of hacking, the programs P7, P8 can be executed as a preventive security measure or automatically as discussed above.

The user then normally browses to a step 38 (which may correspond to a step 24 above) and can confirm or cancel the sensitive operation;

At a stage 39 (which may correspond to a stage 25 above), The server obtains the cookie C2 from the web page received with the confirmation (or cancellation) and goes back to the initial session.

Then in step 40 (which may correspond to the above steps 26-28), the user normally browses on a temporary or anonymous domain and/or another IP address until the communication and the program P2 are terminated.

The Invention May Provide for Characteristics or Considerations, as Follows.

The service server can have a hardware and/or software configuration enabling access to a set (or pool) of domain names registered in the DNS server (ready to use), in order to manage off-domain communications.

Each of these domain names NDn in the set (or pool) can point to the same Web application (and/or service server hosting the Web application) with the same IP address (or alternatively a different address to increase security by preventing malware from detecting, via the same IP address, that it is the same website or web page).

Each of these areas of the above-mentioned set can be reusable or disposable (single use). A service provider (or a program P6) of the service server can possibly generate a pool of domains itself and renew it periodically.

The invention preferably provides that this server 3 will include instructions from a program P7, P8 configured to trigger cross-domain and/or cross-IP address browsing in order to carry out said sensitive operation outside the first secure domain name. However, the invention may provide for these instructions P7, P8 to be at the level of the processing unit 2 (or shared between the unit 2 and the server 3).

Thus, the triggering of a browsing outside the first domain name and/or IP address can be initiated by the user by selecting/operating a security program equivalent to that of the server installed beforehand or by selecting and executing redirection cookies previously received in the processing unit 2.

Sessions (with different domain names) can be compared to out-of-band communications, with the difference that the computer "client" (the browser, the processing unit 2) remains the same since there is no need for an additional device thanks to the invention.

Optionally, in the case of a secure communication session, in particular of the HTTPS type, the invention may provide for each domain to be preferably associated with a dedicated certificate signed by a trusted root certificate (or by a certificate of the service provider itself signed by a trusted root certificate from a certification authority CA).

So, even if the user sees an unidentifiable URL address in the address bar of his/her browser, he/she can also be reassured by a lock icon that guarantees the level of trust of the domain name when used by a user.

The invention also relates to a processing unit 2 to carry out a sensitive operation with a first service server 3 having a first domain name ND1 and/or a first electronic address IP1. The unit 2 is characterized in that it includes a program P1, or micro-code Cl with instructions configured to use at least a second domain name ND2 different from the first domain name ND1 and/or a second electronic address IP2 different from the first address IP1, in the course of all or part of said sensitive operation.

The invention also relates to a service server 3 having a first domain name ND1 and/or a first electronic address IP1 and having a hardware and/or software configuration to carry out a sensitive operation in the course of a communication with a processing unit 2. The server is characterized in that it includes a program P2, P7 including or generating micro-code Cl instructions configured to use at least a second domain name ND2 different from the first domain name ND1 and/or a second electronic address IP2 different from the first address IP1, in the course of all or part of said sensitive operation.

The invention claimed is:

1. A method for carrying out a sensitive operation in the course of a communication between a processing unit and a first service server, said first server being accessible via a first domain name and/or a first electronic address,
the method comprises the step of using at least one second domain name different from the first domain name, and/or a second electronic address different from the first electronic address, in the course of all or part of said sensitive operation,
wherein the method implements a cross-domain sharing mechanism or steps to enable the server and/or service application to share the same user session on at least two domain names and/or at least two electronic addresses,
wherein the server and/or the processing unit implement instructions from a program or steps configured to trigger at an appropriate time a cross-domain and/or cross-address browsing and carry out all or part of said sensitive operation outside the first domain name and/or outside the first address, and
wherein the trigger is based on a level of risk threshold.

2. A method according to claim 1, wherein the method implements cross-domain session cookies.

3. A method according to claim 1, wherein the second domain name is an anonymous type.

4. A method according to claim 1, wherein the first and second electronic addresses are different or identical, the domain names being different from each other.

5. A method according to claim 1, wherein the domain names and/or the electronic addresses are part of a set of domain names and/or electronic addresses pointing to the same site or web page of the server and the number of which is greater than two, the domain names and/or the electronic addresses being renewed regularly.

6. A method according to claim 5, wherein the set of domain names includes a number of domain names greater than 10.

7. A system for carrying out a sensitive operation in the course of a communication between a processing unit and a first service server, said first server being accessible via a first domain name and/or a first electronic address,
comprising a non-transitory computer-readable medium encoded with a micro-code or program, comprising instructions configured to use at least a second domain name different from the first domain name and/or a second electronic address different from the first address, in the course of all or part of said sensitive operation,
the system further comprising a software mechanism for sharing cross-domain sessions to enable the server and/or service application to share the same user session on at least two domain names and/or at least two electronic addresses,
wherein the first service server and/or the processing unit implements instructions from said micro-code or program configured to trigger at an appropriate time a cross-domain and/or cross-address browsing and carry out all or part of said sensitive operation outside the first domain name and/or outside the first address, and
wherein the trigger is based on a level of risk threshold.

8. A system according to claim 7, wherein the domain names and/or the electronic addresses are part of a set of domain names and/or electronic addresses pointing to the same site or web page of the server, the set comprising a number of domain names and/or electronic addresses greater than ten.

9. A processing unit for carrying out a sensitive operation with a first service server having a first domain name and/or a first electronic address,
comprising a program, or micro-code with instructions configured to use at least a second domain name different from the first domain name and/or a second electronic address different from the first address, in the course of all or part of said sensitive operation,
the processing unit further comprising a program, or micro-code with instructions for sharing cross-domain sessions to enable the server and/or service application to share the same user session on at least two domain names and/or at least two electronic addresses,
wherein the processing unit implements instructions from a program or steps configured to trigger at an appropriate time a cross-domain and/or cross-address browsing and carry out all or part of said sensitive operation outside the first domain name and/or outside the first address, and wherein the trigger is based on a level of risk threshold.

10. A service server having a first domain name and/or a first electronic address and having a hardware and/or software configuration to carry out a sensitive operation in the course of a communication with a processing unit, comprising a non-transitory computer-readable medium encoded with a program comprising or generating micro-code instructions configured to use at least a second domain name different from the first domain name and/or a second electronic address different from the first address, in the course of all or part of said sensitive operation, the service server further comprising a program, or micro-code with instructions for sharing cross-domain sessions to enable the server and/or service application to share the same user session on at least two domain names and/or at least two electronic addresses, wherein the service server implements instructions from a program or steps configured to trigger at an appropriate time a cross-domain and/or cross-address browsing and carry out all or part of said sensitive operation outside the first domain name and/or outside the first address, and wherein the trigger is based on a level of risk threshold.

* * * * *